Jan. 17, 1956   H. HORNSCHUCH   2,730,954
SEALING DEVICE FOR PUMPS
Filed July 7, 1954   2 Sheets-Sheet 1

INVENTOR
HANNS HORNSCHUCH
BY
HIS ATTORNEY

_United States Patent Office_

2,730,954
Patented Jan. 17, 1956

2,730,954
SEALING DEVICE FOR PUMPS

Hanns Hornschuch, Easton, Pa., assignor to Ingersoll-Rand Company, New York, N. Y., a corporation of New Jersey Application July 7, 1954, Serial No. 441,775

5 Claims. (Cl. 103—111)

This invention relates to sealing devices, and is particularly adapted for use on pumps of the centrifugal type.

More particularly, the sealing device is intended for pumps pumping fluids of high pressures and temperatures and in which it is essential that the fluid being pumped be restrained from leaking along the impeller shaft to its bearings, and that these parts be maintained at temperatures sufficiently low to assure effective lubrication thereof and also to obviate the chances of lubricant supplied to the pump bearings under high pressure from finding its way into the pumping chamber.

It is accordingly an object of the invention to obviate the chances of leakage of the medium being pumped along the impeller shaft to its bearings.

Another object is to prevent the leakage of lubricant along the impeller shaft into the pumping chamber.

Still another object of the invention is to minimize the transmission of the high temperature of the operating fluid to the pump shaft and its bearings.

Other objects will be in part obvious and in part pointed out hereinafter.

Figure 1:
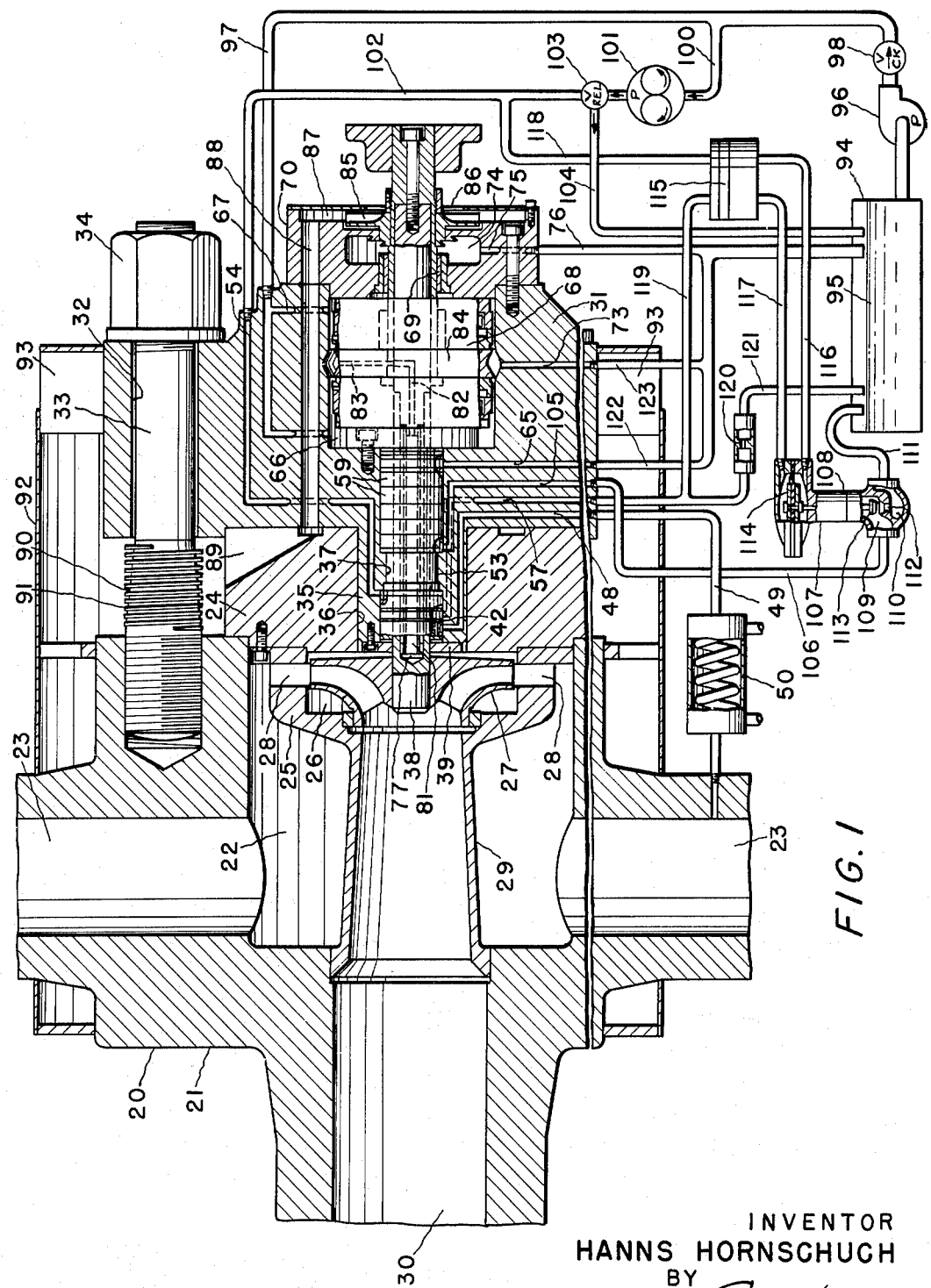
Figure 2:
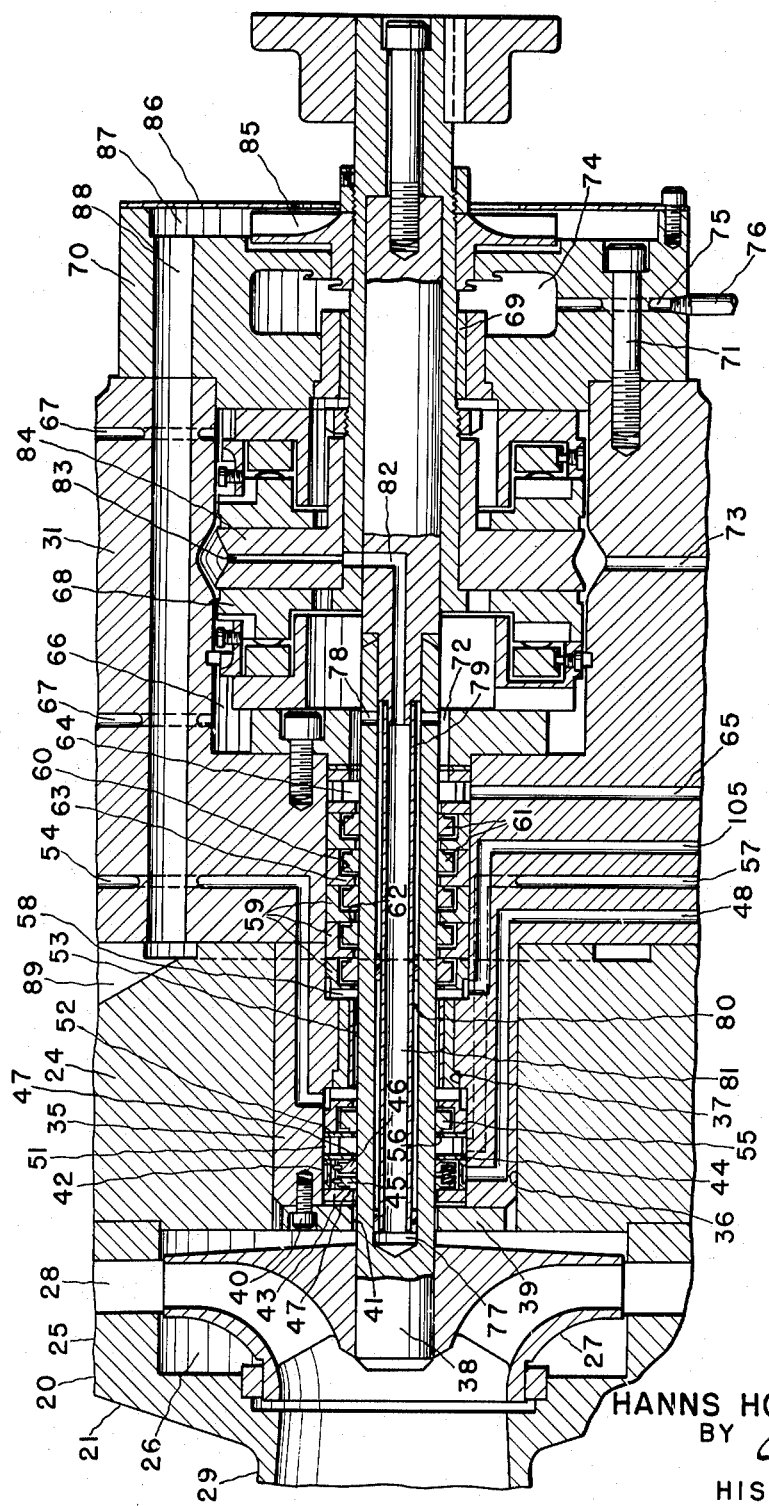

In the drawings accompanying this specification and in which similar reference numerals refer to similar parts, Figure 1 is a longitudinal view, in elevation and partly broken away, of a pump equipped with a sealing device constructed in accordance with the practice of the invention, and Fig. 2 is a similar view, somewhat enlarged, of the rotation parts of the pump and the stationary parts immediately adjacent thereto.

Referring more particularly to the drawings, 20 designates, in general, a pump of the centrifugal type having a casing 21 which is recessed to form therein a discharge chamber 22 having outlets 23.

A closure is provided for the chamber 22 by a head 24 which serves as a support for a casing 25 the interior of which constitutes an impeller chamber 26 for the accommodation of an impeller 27. Communication is afforded between the impeller chamber and the discharge chamber through passages 28 in the casing 25, and an annular extension 29 on said casing extends through the discharge chamber 22 and into the inlet opening 30 of the pump 20 to convey fluid to the impeller.

The head 24 is clamped fixedly to the casing 21 by a housing 31 having apertures 32 for the accommodation of stud bolts 33 which are threaded into the casing 21 and are provided with nuts 34 to bear against the end of the housing 31. Only one bolt 33 is shown, in Figure 1 of the drawings, but it is to be understood that as many will be provided as may be required to withstand the heavy pressures to which the head 24 will be subjected.

On the inner end of the housing 31 is an extension 35 which lies within a bore 36 in the head 24, and in the housing and the extension 35 is a bore 37 for the accommodation of a shaft 38 upon which the impeller 27 is mounted. The bore 37 is of varying diameter throughout its length and the end thereof adjacent the impeller chamber 26 is covered by a plate 39 which is secured to the extension 35 by bolts 40 and has an axial bore 41 to receive the shaft 38.

The portion of the bore 37 adjacent the plate 39 constitutes a sealing chamber 42 and its inner and outer extremities are defined by plates 43 and 44, respectively, which may be held in spaced relation with respect to each other in any suitable manner. The sealing chamber 42 contains a pair of sealing members 45 and 46 in the form of rings that have a slide fit on the shaft 38 and are of sufficiently smaller diameter than the encircling parts to prevent contact therewith in the event of an erratic action of the shaft. The rings 45 and 46 may be held against rotary movement in any well known manner and are spaced with respect to each other to permit of the free entrance therebetween of sealing fluid, and on the outer end surfaces of said rings are annular sealing areas 47 for engagement with the plates 43 and 44 to control the leakage of fluid from the sealing chamber 42 along the surface of the shaft.

The sealing fluid supplied to the chamber 42 is conveyed thereto by a passage 48 in the housing 31 and a conduit 49 connecting the passage 48 with an outlet 23 of the discharge chamber 22. Thus, the pressure supplied to the sealing chamber 42 will be of the same value as the discharge pressure of the pump and will, therefore, be greater than the pressure in the impeller chamber immediately adjacent the shaft 38 which, as is well understood, is lower than the discharge pressure by reason of the impelling effect of the adjacent surface of the impeller 27 upon the fluid lying between the impeller and the head 24. A suitable cooling unit 50 is interposed in the conduit 49 to reduce the temperature of the sealing fluid entering the chamber 42 to a low value for cooling the shaft and the parts adjacent thereto in the area of the sealing chamber 42.

In practice, any sealing fluid which passes from the chamber 42 along the surfaces of the sealing ring 45 will return to the impeller chamber 26, and the fluid that leaks past and through the ring 46 enters a drain chamber 51 defined by the plate 44 and a similar plate 52 spaced with respect thereto in the chamber 42.

In order to prevent the flow of sealing fluid to the main bearing 53 for the impeller end of the shaft 38, the housing 31 is provided with a passage 54 for conveying lubricating oil into the end of the sealing chamber 42 adjacent the bearing 53. The pressure of the oil thus introduced into the sealing chamber is of higher value than that which exists in the drain chamber 51 and leakage of oil toward the drain chamber 51 is controlled by a sealing ring 55 which has a sliding fit on the shaft 38 and an annular area 56 for sealing engagement with the plate 52.

The ring 5 is capable of a limited degree of endwise movement upon the shaft and is held in sealing engagement with the plate 52 by the pressure of the oil in the the sealing chamber 42. Any oil that leaks past the sealing area 56 and the plate 52 and through the ring 55 will enter the chamber 51 and be drained therefrom, together with the sealing fluid, through a passage 57 in the housing 31.

The oil which passes through the bearing 53 enters a chamber 58 adjacent the end of the bearing 53 and in said chamber is a series of containers 59 each having an annular chamber 60 for the accommodation of a sealing ring 61 similar to that designated 55. Each sealing ring 61 accordingly has an annular area 62 immediately adjacent the shaft 38 for engagement with an introverted flange 63 on the adjacent container 59 to break down the pressure of the oil issuing from the bearing 53. Each container 59 is suitably spaced from the shaft 38 so that the oil which passes a given ring 61 may flow freely along the shaft to the next succeeding ring.

After passing through the containers 59 the oil enters a chamber 64 and is drained therefrom through a passage 65 in the housing 31. Adjacent the chamber 64 is an enlarged chamber 66 into which oil is delivered through passages 67 for lubricating the essential surfaces of a thrust bearing assembly 68 in the chamber 66 and a main bearing 69 adjacent thereto for the shaft 38. The bearing 69 is arranged within a head 70 that forms a closure for the outer end of the chamber 66 and is secured to the housing 31 by bolts 71.

The oil supplied to the chamber 66 for lubricating the thrust bearing assembly and the main bearing 69 is of a considerably lower pressure than that supplied to the bearing 53 and the chamber 66 is in direct communication with the chamber 64 through an annular passage 72 encircling the shaft 38 and oil will then also be drained from the chamber 66 through the passage 65. The housing 31 has an additional drainage passage 73 which opens into the intermediate portion of the chamber 66.

A drain chamber 74 is also provided in the head 70, at the outer end of the bearing 69, for the interception of the oil that passes through the bearing 69, and a passage 75 in the head 70 leads to a drain tube 76 for conveying such oil from the chamber 74.

An additional function of the oil supplied to the chamber 66 is to effect the cooling of the shaft 38. To this end the portion of the shaft extending from the chamber 66 to the impeller chamber 26 is provided with a bore 77 that communicates with the annular channel 72 through ports 78 in the shaft, and a tube 79 disposed within the bore 77 cooperates therewith to define an annular passage 80 through which the oil flows from the ports 78 to the impeller end of the bore 77. The interior of the tube 79 constitutes a passage 81 for the reverse flow of oil to a passage 82 which leads to a radially extending channel 83 in the thrust collar 84 of the thrust bearing assembly. The channel 83 opens into the peripheral area of the chamber 66 and serves as an impelling means for causing the rapid circulation of oil through the shaft 38.

In order that heat transmitted to the casing parts of the pump adjacent the impeller chamber 26 may be dissipated, a fan 85 is mounted upon the shaft 38 at the outer end of the head 70, and an annular plate 86 overlying said end of the head 70 cooperates therewith to define a chamber 87 into which the fan 85 exhausts. A series of passages 88 extend endwise of the head 70 and the housing 31 from the chamber 87 to recesses 89 in the head 24 for conveying the air to the exposed portions 90 of the stud bolts 33 lying between the casing 21 and the housing 31, such exposed portions 90 of the bolts being provided with fins 91 for expediting the transmission of the heat to the air flowing thereover.

A casing 92 encircles the housing 31 and the body portion of the casing 21 in spaced relation therewith to direct the air blown by the fan 85 along the surfaces of these parts and has openings 93 adjacent the outer end of the housing 31 for the escape of the air to the atmosphere.

The devices that serve to supply lubricant to the bearing portions of the pump, and which are shown diagrammatically for the sake of simplicity of illustration, comprise a reservoir 94 for oil 95 and a primary pump 96 for pumping oil from the reservoir through a conduit 97 to the passages 67, said conduit 97 having a check valve 98 to prevent the reverse flow of oil in the conduit 97. The conduit 97 also has a branch 100 leading to a secondary pump 101, of the gear type, the output of which is delivered under high pressure to the passage 54 by a discharge conduit 102. A relief valve 103 in the discharge conduit 102 discharges into a conduit 104 leading to the reservoir 94.

Means other than the relief valve 103 are provided for maintaining a desired pressure in the chamber 58 and to this end the housing 31 is provided with a passage 105 that leads from the chamber 58 to a conduit 106 connected to a pressure regulator 107 comprising a casing 108 having inlet and outlet chambers 109 and 110, the latter communicating with the reservoir 94 through a conduit 111. A port 112 affords communication between the chambers 109 and 110 and is controlled by a valve 113 suspended from a diaphragm 114 the movement of which is controlled by a controller 115 of a well known type that is connected to the casing 108 below and above the diaphragm 114 through conduits 116 and 117, respectively.

The fluid controlled by the controller 115 and flowing through the conduit 116 for action against the diaphragm 114, to open the valve 113, is conveyed to the controller by a conduit 118 leading from the discharge conduit 102 of the pump 101. And the fluid which determines the pressure above the diaphragm 114 for moving the valve 113 towards its closed position is conveyed to the controller 115 by a conduit 119 leading from the passage 57 and is, therefore, of the pressure existing in the drain chamber 51. Such pressure is modified by an orifice 120 in a branch conduit 121 leading from the conduit 119 to the reservoir 94.

Suitable conduits 122 and 123 lead from the passages 65 and 73 to the conduit 76 to drain the oil from the chamber 64 and the enlarged chamber 66 to the reservoir 94.

In the operation of the device, and assuming the pump 20 and the oil pumps 96 and 101 to be in operation, sealing fluid flows from the discharge side of the pump 20 through the conduit 49 and the passage 48 into the sealing chamber 42. The pressure of such fluid will act against the inner surfaces of the sealing rings 45 and 46 and force the annular sealing areas 47 thereof into sealing engagement with the plates 43 and 44.

Owing to the high pressure of the sealing fluid a portion thereof will flow through the rings 45 and 46 even though said rings have only a slide fit upon the shaft 38 and, under certain conditions of operation as when the shaft passes through a critical speed, some of the sealing fluid will also leak past the surface 47. The fluid which passes the ring 45 enters the impeller chamber 26 in the area of the shaft 38.

The fluid that flows from the sealing chamber past the ring 46 enters the drain chamber 51 as will also the oil that flows past the sealing ring 55 from the inner end of the sealing chamber 42. This mixture of oil and sealing fluid flows from the drain chamber 51 through the passage 57 and the conduit 121 to the reservoir 94 as well as to the controller 115 to effect the application of a pressure above the diaphragm 114 tending to move the valve 113 to its closed position. At the same time there will be a copious flow of oil from the inner end of the sealing chamber 42 through the bearing 53, which is suitably grooved for that purpose, and such oil flows into the chamber 58, thence through the group of sealing rings 61 whereby its pressure is broken down to a value closely approaching that existing in the chamber 66 and together with oil flowing from the chamber 66 through the channel 72, will escape through the drain passage 65 and associated to the reservoir 94.

Oil will also flow from the channel 72 through the port 78 and through the annular channel 80 within the shaft 38 to the end of the bore 77 adjacent the impeller 27. It then flows through the passages 81 and 82 to the channel 83 in the thrust collar 84 which exerts an impelling effect upon the oil, thereby assuring its rapid flow through the shaft to carry off heat from the impeller end of the shaft and the parts adjacent thereto.

During such operation of the pump 20 and the oil pumps 96 and 101 oil discharged by the pump 101 will flow through the conduit 118 to the controller which will act in response thereto to apply a pressure impulse beneath the diaphragm 114 for unseating the valve 113 to effect a relief of pressure of the oil adjacent the entrance end of the group of sealing rings 61 and thereby maintain a desired ratio of pressure between such entrance end and the discharge pressure of the pump 101.

I claim:

1. In a sealing device for pumps pumping liquids at high pressure, the combination of a casing having an impeller chamber and a bore opening into the chamber, an impeller rotatable in the impeller chamber, a shaft rotatable in the bore and supporting the impeller, a bearing in the bore supporting the shaft, a sealing chamber in the bore between the bearing and the impeller chamber, means in the casing connected to supply sealing liquid under pump discharge pressure to the sealing chamber, sealing means disposed in the sealing chamber and subjected to the pressure of the sealing liquid for controlling the flow of such liquid toward the bearing, a drain chamber positioned in the bore between the sealing chamber and the bearing to intercept sealing liquid leaking past the sealing means toward the bearing, means in the casing connected to supply lubricating oil under pressure to the bearing, and means positioned in the bore to control the leakage of such oil to the drain chamber.

2. In a sealing device for pumps pumping liquids at high pressure, the combination of a casing having an impeller chamber and a bore opening into the chamber, an impeller rotatable in the impeller chamber, a shaft extending through the bore and supporting the impeller, a bearing in the bore supporting the shaft, a sealing chamber in the bore adjacent the impeller chamber, means in the casing connected to supply sealing liquid under pump discharge pressure to the sealing chamber, sealing means in the sealing chamber encircling the shaft and actuated by the sealing liquid to control the leakage of such liquid along the shaft toward the impeller chamber and toward the bearing, means in the casing connected to supply lubricating oil under pressure to the bearing, a sealing member in the bore encircling the shaft and actuated into sealing engagement with the casing by the oil to control the leakage of such oil toward the impeller chamber, and a drain chamber positioned in the bore between the sealing chamber and the bearing to intercept sealing liquid and oil leaking past said sealing means and said sealing member.

3. In a sealing device for pumps pumping liquids at high pressure, the combination of a casing having an impeller chamber and a bore opening into the chamber, an impeller rotatable in the impeller chamber, a shaft extending through the bore and supporting the impeller, a bearing in the bore supporting the shaft, means in the casing connected to supply sealing fluid at the discharge pressure of the pump to the bore between the impeller chamber and the bearing, a pair of floating non-rotary rings on the shaft subjected to the pressure of the sealing fluid and cooperating with the shaft and the casing to control leakage of such sealing fluid toward the impeller chamber and toward the bearing, means in the casing connected to supply lubricating oil under pressure to the bearing, a floating non-rotary ring on the shaft cooperating with the shaft and the casing to control leakage of oil toward the impeller chamber and being held in sealing engagement with the casing by the pressure of the oil, and a drain chamber in the bore positioned to intercept sealing fluid and oil leaking past the first and second mentioned floating rings.

4. In a sealing device for pumps pumping hot liquids at high pressure, the combination of a casing having an impeller chamber and a bore opening into the chamber, an impeller rotatable in the impeller chamber, a shaft rotatable in the bore and supporting the impeller, a bearing in the bore supporting the shaft, means in the casing connected to supply lubricating oil under pressure to the bearing, ports and passages positioned in the shaft for the passage of oil therethrough to cool said shaft, a sealing member on the shaft cooperating therewith and with the casing to control the leakage of oil toward the impeller chamber, means in the casing connected to supply sealing fluid at the pump discharge pressure to the bore adjacent the impeller chamber, sealing means in the bore cooperating with the shaft and the casing to control the leakage of sealing fluid toward the bearing and toward the impeller chamber, and a drain chamber in the bore positioned between the sealing member and the sealing means to intercept oil and sealing fluid leaking past said sealing member and the sealing means.

5. In a sealing device for pumps pumping hot liquids at high pressure, the combination of a casing having an impeller chamber and a bore opening into the chamber and having an enlarged portion, an impeller rotatable in the impeller chamber, a shaft extending through the bore and supporting the impeller, a bearing in the bore supporting the shaft, means in the casing connected to supply sealing liquid under pump discharge pressure to the bore adjacent the impeller chamber, sealing means in the bore cooperating with the shaft and the casing to control the leakage of sealing liquid toward the impeller chamber and toward the bearing, means in the casing connected to supply lubricating oil under high pressure to the bearing, means in the bore defining a channel for conveying oil from the bearing to the bore enlarged portion, ports and passages in the shaft connected to convey oil from the bore enlarged portion into the shaft for cooling said shaft, and impeller means on the shaft adapted to pump oil from said passages into the said bore enlarged portion.

References Cited in the file of this patent

UNITED STATES PATENTS

| 1,721,737 | Joyce | July 23, 1929 |
| 1,842,081 | Durdin, Jr. | Jan. 19, 1932 |
| 2,257,011 | Hillier | Sept. 23, 1941 |

FOREIGN PATENTS

| 515,616 | France | Apr. 5, 1921 |